United States Patent
Shimizu et al.

(10) Patent No.: US 10,814,862 B2
(45) Date of Patent: Oct. 27, 2020

(54) HYBRID VEHICLE

(71) Applicant: TOYOTA JIDOSHA KABUSHIKI KAISHA, Toyota-shi, Aichi-ken (JP)

(72) Inventors: Yu Shimizu, Toyota (JP); Takashi Ando, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 108 days.

(21) Appl. No.: 15/828,783

(22) Filed: Dec. 1, 2017

(65) Prior Publication Data

US 2018/0154759 A1 Jun. 7, 2018

(30) Foreign Application Priority Data

Dec. 7, 2016 (JP) .................................. 2016-237652

(51) Int. Cl.
  *B60W 20/50* (2016.01)
  *B60K 6/445* (2007.10)
  (Continued)

(52) U.S. Cl.
  CPC ............. *B60W 20/50* (2013.01); *B60K 6/445* (2013.01); *B60L 15/20* (2013.01); *B60L 50/15* (2019.02);
  (Continued)

(58) Field of Classification Search
  CPC ...... B60W 10/06; B60W 10/08; B60W 11/14; B60W 20/00; B60W 20/50; B60W 50/29;
  (Continued)

(56) References Cited

U.S. PATENT DOCUMENTS

2006/0152085 A1* 7/2006 Flett .......................... B60L 9/30
  307/75
2009/0058339 A1* 3/2009 Kitano ................... B60K 6/445
  318/400.22

(Continued)

FOREIGN PATENT DOCUMENTS

JP 2009-225500 10/2009
JP 2010-012827 1/2010

(Continued)

*Primary Examiner* — Jeffrey A Shapiro
(74) *Attorney, Agent, or Firm* — Finnegan, Henderson, Farabow, Garrett & Dunner, LLP

(57) ABSTRACT

There is provided a hybrid vehicle comprising an engine; a first motor configured to generate a reverse voltage by rotation; a planetary gear mechanism configured such that three rotational elements are respectively connected with a driveshaft coupled with an axle, with the engine, and with the first motor; a second motor configured to input and output power from and to the driveshaft; a first inverter configured to drive the first motor; a second inverter configured to drive the second motor; a power storage device; and a converter placed between the power storage device and the first inverter along with the second inverter. In an evacuation travel with an accelerator-on operation during an inverter failure, the hybrid vehicle shuts off gates of the first inverter and the second inverter, controls a rotation speed of the engine such as to rotate the first motor at a predetermined rotation speed, and controls a voltage of a second power line such as to maximize an inter-line current that flows from the second power line to a first power line via the converter.

7 Claims, 4 Drawing Sheets

(51) Int. Cl.

| | | |
|---|---|---|
| *B60W 10/06* | (2006.01) | |
| *B60W 20/30* | (2016.01) | |
| *B60W 10/08* | (2006.01) | |
| *B60L 50/16* | (2019.01) | |
| *B60L 15/20* | (2006.01) | |
| *B60L 58/12* | (2019.01) | |
| *B60L 50/15* | (2019.01) | |
| *B60L 50/51* | (2019.01) | |
| *B60K 6/28* | (2007.10) | |
| *B60L 3/00* | (2019.01) | |

(52) U.S. Cl.
CPC ............... *B60L 50/16* (2019.02); *B60L 50/51* (2019.02); *B60L 58/12* (2019.02); *B60W 10/06* (2013.01); *B60W 10/08* (2013.01); *B60W 20/30* (2013.01); *B60K 6/28* (2013.01); *B60L 3/003* (2013.01); *B60L 2210/14* (2013.01); *B60L 2220/42* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2240/527* (2013.01); *B60L 2240/529* (2013.01); *B60L 2240/54* (2013.01); *B60L 2240/545* (2013.01); *B60L 2240/547* (2013.01); *B60L 2240/549* (2013.01); *B60L 2250/26* (2013.01); *B60Y 2200/92* (2013.01); *Y02T 10/6239* (2013.01); *Y02T 10/6286* (2013.01)

(58) Field of Classification Search
CPC . B60W 2050/0292; B60W 2050/0297; B60W 20/30; B60L 15/20; B60L 3/00; B60L 3/003; B60L 15/2045; B60L 50/10; B60L 50/16; B60L 58/12; B60L 50/15; B60L 2240/441; B60L 2220/42; B60L 2240/549; B60L 2240/54; B60L 2240/443; B60L 2240/529; B60L 2240/423; B60L 2210/14; B60L 2250/26; B60L 2240/527; B60L 2240/545; B60L 2240/421; B60L 2240/12; B60L 2240/486; B60L 2240/547; B60K 6/445; B60K 6/28; Y02T 10/6239; Y02T 10/6286; B60Y 2200/92

USPC .......................................................... 477/3
See application file for complete search history.

(56) References Cited

U.S. PATENT DOCUMENTS

| | | | | |
|---|---|---|---|---|
| 2009/0284198 | A1* | 11/2009 | Shimana | B60L 3/003 |
| | | | | 318/400.21 |
| 2010/0027170 | A1* | 2/2010 | Kishimoto | B60L 50/61 |
| | | | | 361/31 |
| 2010/0063660 | A1* | 3/2010 | Uchida | B60L 50/61 |
| | | | | 701/22 |
| 2010/0296204 | A1* | 11/2010 | Ichikawa | B60K 6/445 |
| | | | | 361/15 |
| 2011/0193532 | A1* | 8/2011 | Iwanaga | H02J 7/02 |
| | | | | 320/163 |
| 2012/0136519 | A1* | 5/2012 | Suzuki | B60W 20/00 |
| | | | | 701/22 |
| 2013/0116078 | A1* | 5/2013 | Hokoi | B60L 50/16 |
| | | | | 475/5 |
| 2013/0307489 | A1* | 11/2013 | Kusch | B60L 58/26 |
| | | | | 320/162 |
| 2014/0114523 | A1* | 4/2014 | Hirasawa | B60K 6/445 |
| | | | | 701/22 |
| 2015/0014073 | A1* | 1/2015 | Murakami | B60K 6/26 |
| | | | | 180/65.24 |
| 2015/0258986 | A1* | 9/2015 | Hayakawa | B60W 10/06 |
| | | | | 701/22 |
| 2016/0236669 | A1* | 8/2016 | Amano | B60W 20/10 |
| 2016/0280218 | A1* | 9/2016 | Oba | B60W 20/50 |
| 2017/0077859 | A1* | 3/2017 | Chretien | H02P 27/06 |
| 2017/0327107 | A1* | 11/2017 | Ando | B60K 6/445 |

FOREIGN PATENT DOCUMENTS

| | | | |
|---|---|---|---|
| JP | 2013-203116 | 10/2013 | |
| JP | 2013-207833 | 10/2013 | |
| JP | 2016-107802 | 6/2016 | |
| WO | WO-2016087924 A1 * | 6/2016 | ............ B60K 6/445 |

* cited by examiner

HYBRID VEHICLE

CROSS-REFERENCE TO RELATED APPLICATION

The present disclosure claims priority to Japanese Patent Application No. 2016-237652 filed on Dec. 7, 2016, which is incorporated herein by reference in its entirety including specification, drawings and claims.

TECHNICAL FIELD

The present disclosure relates to a hybrid vehicle and more specifically to a hybrid vehicle in which an engine and two motors are connected to a planetary gear mechanism.

BACKGROUND

A proposed configuration of a hybrid vehicle includes an engine; a first motor configured to generate a reverse voltage by rotation; a planetary gear mechanism configured such that three rotational elements are respectively connected with a driveshaft coupled with an axle, with the engine, and with the first motor; and a second motor configured to output power to the driveshaft (as described in, for example, JP 2013-203116A). When the engine is driven in the event of a failure of inverters configured to drive the first motor and the second motor, this hybrid vehicle shuts off gates of the inverters and controls the rotation speed of the engine such as to cause the first motor to generate the reverse voltage. This hybrid vehicle is then driven with a torque that is generated by generation of the reverse voltage of the first motor and that is output to the driveshaft as a drive torque.

CITATION LIST

Patent Literature

PTL 1: JP 2013-203116A

SUMMARY

The torque generated by generation of the reverse voltage of the motor starts generating and increasing when the reverse voltage exceeds a DC-side voltage of the inverters with an increase in rotation speed of the motor, and gradually decreases after the reverse voltage reaches a maximum value (peak). In order to maximize the motor torque, there is a need to control the rotation speed of the motor to a rotation speed that provides the maximum value (peak) of reverse voltage relative to the DC-side voltage of the inverters. The reverse voltage of the motor, however, varies, depending on, for example, the production tolerance of the motor, the temperature of the motor and the sensing error of the voltage sensor. Controlling the rotation speed of the motor to the rotation speed that provides the maximum value (peak) of reverse voltage relative to the DC-side voltage of the inverters is thus unlikely to maximize the torque actually output from the motor.

A hybrid vehicle of the present disclosure mainly aims to cause a larger torque to be output from a first motor during an evacuation travel with the torque that is output from the first motor by generation of a reverse voltage of the first motor when gates of inverters are shut off in the event of a failure of the inverters.

In order to achieve the above main object, the hybrid vehicle of the present disclosure is implemented by the following aspects.

The present disclosure is directed to a hybrid vehicle. The hybrid vehicle includes an engine, a first motor configured to generate a reverse voltage by rotation, a planetary gear mechanism configured such that three rotational elements are respectively connected with a driveshaft coupled with an axle, with the engine, and with the first motor, a second motor configured to input and output power from and to the driveshaft, a first inverter configured to drive the first motor, a second inverter configured to drive the second motor, a power storage device, a converter connected with a first power line that is connected with the power storage device, and with a second power line that is connected with the first inverter and the second inverter, and configured to transmit electric power between the first power line and the second power line by regulating a high voltage-side voltage of the second power line, and a control device configured to control the engine, the converter, the first inverter and the second inverter. In an evacuation travel with an accelerator-on operation during an inverter failure where the first inverter and the second inverter malfunction, the control device shuts off gates of the first inverter and the second inverter, controls a rotation speed of the engine such as to rotate the first motor at a predetermined rotation speed, and controls the high voltage-side voltage such as to maximize an inter-line current that flows from the second power line to the first power line via the converter.

In an evacuation travel with an accelerator-on operation during an inverter failure where the first inverter and the second inverter malfunction, the hybrid vehicle of this aspect shuts off the gates of the first inverter and the second inverter and drives the engine to rotate the first motor. The first motor is configured to generate a reverse voltage by rotation. When the reverse voltage becomes higher than a DC-side voltage of the first inverter and the second inverter, a torque is output from the first motor, and an electric current (inter-line current) flows from the second power line to the first power line. The torque output from the first motor is output via the planetary gear mechanism to the driveshaft as a drive torque and is used as the torque for driving the vehicle. The torque output from the first motor is attributed to the reverse voltage of the first motor and is accordingly determined by the voltage of the second power line (high voltage-side voltage) and the rotation speed of the first motor. Increasing the torque results in increasing the electric current flowing from the second power line to the first power line (inter-line voltage). The hybrid vehicle of this aspect accordingly specifies the rotation speed of the first motor that enables a large torque to be output from the first motor, as the predetermined rotation speed, controls the rotation speed of the engine such as to rotate the first motor at the predetermined rotation speed, and controls the high voltage-side voltage such as to maximize the inter-line current. This results in maximizing the torque output from the first motor. This accordingly enables a larger torque to be output from the first motor during the evacuation travel. The high voltage-side voltage may be controlled by the converter. The "predetermined rotation speed" may be a rotation speed of the first motor that maximizes a full-wave rectifying torque of the first motor at a predetermined voltage as the high voltage-side voltage.

DESCRIPTION OF EMBODIMENTS

Figure 1:
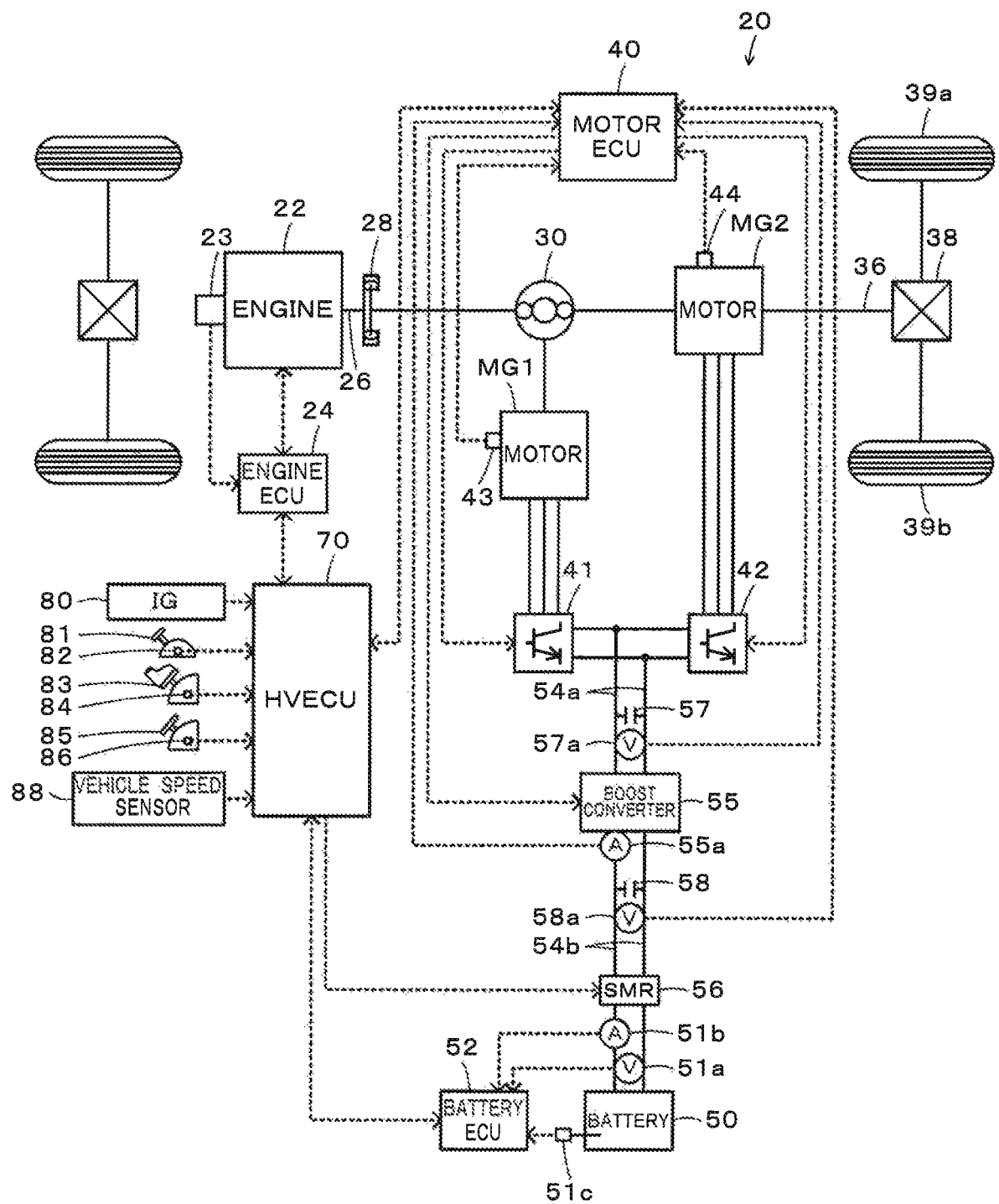
FIG. 1 is a configuration diagram illustrating the schematic configuration of a hybrid vehicle according to an embodiment.
Figure 2:
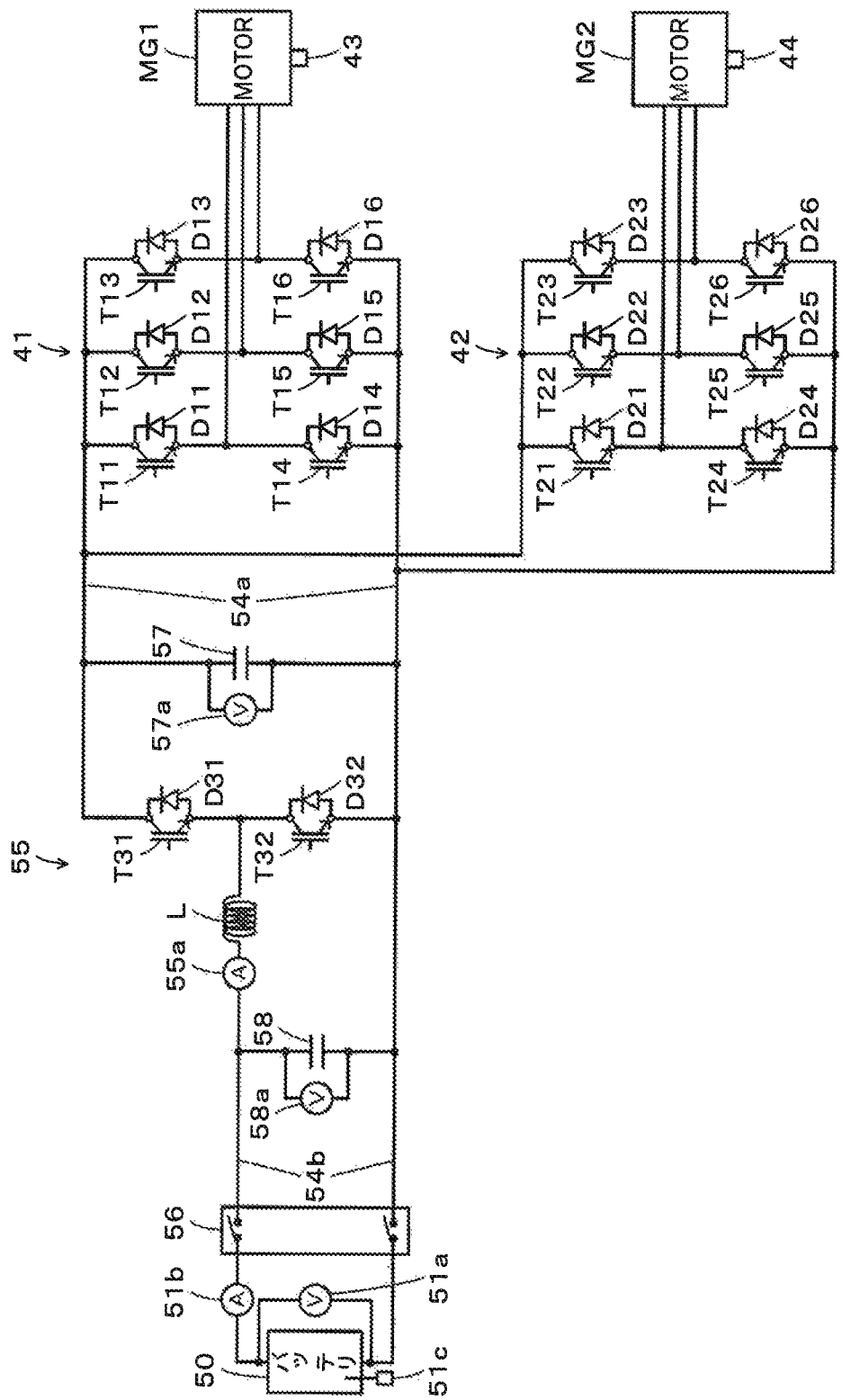
FIG. 2 is a configuration diagram illustrating the schematic configuration of an electric drive system including motors MG1 and MG2.

The following describes aspects of the disclosure with reference to some embodiments. FIG. 1 is a configuration diagram illustrating the schematic configuration of a hybrid vehicle 20 according to an embodiment, and FIG. 2 is a configuration diagram illustrating the schematic configuration of an electric drive system including motors MG1 and MG2. As shown in FIG. 1, the hybrid vehicle 20 of the embodiment includes an engine 22, a planetary gear 30, motors MG1 and MG2, inverters 41 and 42, a battery 50 as a power storage device, a boost converter 55, a system main relay 56 and a hybrid electronic control unit (hereinafter referred to as "HVECU") 70.

The engine 22 is configured as an internal combustion engine to output power using, for example, gasoline or light oil as a fuel. This engine 22 is subjected to operation control by an engine electronic control unit (hereinafter referred to as "engine ECU") 24.

The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22, for example, a crank angle θcr from a crank position sensor 23 configured to detect the rotational position of a crankshaft 26 of the engine 22, are input into the engine ECU 24 via the input port. Various control signals for operation control of the engine 22 are output from the engine ECU 24 via the output port. The engine ECU 24 is connected with the HVECU 70 via the respective communication ports. The engine ECU 24 calculates a rotation speed Ne of the engine 22, based on the crank angle θcr input from the crank position sensor 23.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 39a and 39b via a differential gear 38. The planetary gear 30 further includes a carrier that is connected with the crankshaft 26 of the engine 22 via a damper 28.

The motor MG1 is configured as a synchronous motor generator having a rotor with permanent magnets embedded therein and a stator with three-phase coils wound thereon. As described above, the rotor is connected with the sun gear of the planetary gear 30. The motor MG2 is also configured as a synchronous motor generator having a rotor with permanent magnets embedded therein and a stator with three-phase coils wound thereon like the motor MG1 and includes a rotor that is connected with the driveshaft 36.

As shown in FIG. 2, the inverter 41 is connected with high voltage-side power lines 54a. This inverter 41 includes six transistors T11 to T16 and six diodes D11 to D16 that are connected in parallel to and in a reverse direction to the transistors T11 to T16. The transistors T11 to T16 are arranged in pairs, such that two transistors in each pair respectively serve as a source and a sink relative to a positive electrode line and a negative electrode line of the high voltage-side power lines 54a. The respective phases of the three-phase coils (U phase, V phase and W phase) of the motor MG1 are connected with connection points of the respective pairs of the transistors T11 to T16. Accordingly, when a voltage is applied to the inverter 41, a motor electronic control unit (hereinafter referred to as "motor ECU") 40 serves to regulate the rates of ON times of the respective pairs of the transistors T11 to T16, such as to provide a rotating magnetic field in the three-phase coils and thereby rotate and drive the motor MG1. Like the inverter 41, the inverter 42 is also connected with the high voltage-side power lines 54a and includes six transistors T21 to T26 and six diodes D21 to D26. When a voltage is applied to the inverter 42, the motor ECU 40 serves to regulate the rates of ON times of the respective pairs of the transistors T21 to T26, such as to provide a rotating magnetic field in the three-phase coils and thereby rotate and drive the motor MG2.

The boost converter 55 is connected with the high voltage-side power lines 54a connected with the inverters 41 and 42 and is also connected with low voltage-side power lines 54b connected with the battery 50. This boost converter 55 includes two transistors T31 and T32, two diodes D31 and D32 connected in-parallel to and in a reverse direction to the transistors T31 and T32, and a reactor L. The transistor T31 is connected with the positive electrode line of the high voltage-side power lines 54a. The transistor T32 is connected with the transistor 31 and with negative electrode lines of the high voltage-side power lines 54a and of the low voltage-side power lines 54b. The reactor L is connected with a connection point between the transistors T31 and T32 and with a positive electrode line of the low voltage-side power lines 54b. The motor ECU 40 serves to regulate the rates of ON times of the transistors T31 and T32, such that the boost converter 55 steps up an electric power of the low voltage-side power lines 54b and supplies the stepped-up electric power to the high voltage-side power lines 54a, while stepping down an electric power of the high voltage-side power lines 54a and supplying the stepped-down electric power to the low voltage-side power lines 54b. A smoothing capacitor 57 is mounted to the positive electrode line and the negative electrode line of the high voltage-side power lines 54a. A smoothing capacitor 58 is mounted to the positive electrode line and the negative electrode line of the low voltage-side power lines 54b.

The motor ECU 40 is configured as a CPU-based microprocessor and includes a ROM configured to store processing programs, a RAM configured to temporarily store data, input/output ports and a communication port, in addition to the CPU, although not being illustrated. As shown in FIG. 1, signals from various sensors required for drive control of the motors MG1 and MG2 and the boost converter 55 are input into the motor ECU 40 via the input port. The signals input into the motor ECU 40 include, for example, rotational positions θm1 and θm2 from rotational position detection sensors (for example, resolvers) 43 and 44 configured to detect the rotational positions of the respective rotors of the motors MG1 and MG2, and phase currents Iu1, Iv1, Iu2 and Iv2 from current sensors (not shown) configured to detect electric currents flowing in the respective phases of the motors MG1 and MG2. The input signals also include a voltage VH of the capacitor 57 (i.e., voltage of the high voltage-side power lines 54a (high voltage-side voltage)) from a voltage sensor 57a mounted between terminals of the capacitor 57, a voltage VL of the capacitor 58 (i.e., voltage of the low voltage-side power lines 54b (low voltage-side voltage)) from a voltage sensor 58a mounted between terminals of the capacitor 58, and an electric current (reactor current) IL flowing in the reactor L, from a current sensor 55a mounted to a terminal of the reactor L. The motor ECU 40 outputs, for example, switching control signals to the transistors T11 to T16 of the inverter 41 and the transistors T21 to T26 of the inverter 42 and switching control signals to the transistors T31 and T32 of the boost converter 55 via the output port. The motor ECU 40 is connected with the HVECU 70 via the respective communication ports. The motor ECU 40 calculates electrical angles θe1 and θe2 and rotation speeds Nm1 and Nm2 of the respective motors MG1 and MG2, based on the rotational positions θm1 and θm2 of the respective rotors of the motors MG1 and MG2 input from the rotational position detection sensors 43 and 44.

The battery 50 is configured as, for example, a lithium ion rechargeable battery or a nickel metal hydride battery and is connected with the low voltage-side power lines 54b. This battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data, input/output ports and a communication port, in addition to the CPU, although not being illustrated. Signals from various sensors required for management of the battery 50 are input into the battery ECU 52 via the input port. The signals input into the battery ECU 52 include, for example, a voltage (battery voltage) VB from a voltage sensor 51a mounted between terminals of the battery 50, an electric current (battery current) IB from a current sensor 51b mounted to an output terminal of the battery 50, and a temperature (battery temperature) Tb from a temperature sensor 51c mounted to the battery 50. The battery ECU 52 is connected with the HVECU 70 via the respective communication ports. The battery ECU 52 calculates a state of charge SOC, based on an integrated value of the battery current IB input from the current sensor 51b. The state of charge SOC denotes a ratio of the capacity of electric power dischargeable from the battery 50 to the overall capacity of the battery 50.

The system main relay 56 is provided on the battery 50-side of the capacitor 58 in the low voltage-side power lines 54b. This system main relay 56 is controlled on and off by the HVECU 70 to connect and disconnect the battery 50 with and from the boost converter 55.

The HVECU 70 is configured as a CPU-based microprocessor and includes a ROM configured to store processing programs, a RAM configured to temporarily store data, input/output ports and a communication port, in addition to the CPU, although not being illustrated. Signals from various sensors are input into the HVECU 70 via the input port. The signals input into the HVECU 70 include, for example, an ignition signal from an ignition switch 80 and a shift position SP from a shift position sensor 82 configured to detect an operating position of a shift lever 81. The input signals also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. Examples of the shift position SP provided herein include a parking position (P position), a reverse position (R position), a neutral position (N position) and a drive position (D position). The HVECU 70 is connected with the engine ECU 24, the motor ECU 40 and the battery ECU 52 via the respective communication ports as described above.

The hybrid vehicle 20 of the embodiment having the above configuration is driven in a hybrid drive (HV drive) mode with operation of the engine 22 or in an electric drive (EV drive) mode without operation of the engine 22.

In the HV drive mode, the HVECU 70 sets a required torque Td* that is required for driving (i.e., required for the driveshaft 36), based on the accelerator position Acc and the vehicle speed V, and calculates a required power Pd* that is required for driving (i.e., required for the driveshaft 36) by multiplying the set required torque Td* by a rotation speed Nd of the driveshaft 36 (rotation speed Nm2 of the motor MG2). The HVECU 70 subsequently sets a required power Pe* that is required for the vehicle (i.e., required for the engine 22) by subtracting a required charge-discharge power Pb* of the battery 50 (which takes a positive value when the battery 50 is discharged) based on the state of charge SOC from the required power Pd*. The HVECU 70 sets a target rotation speed Ne* and a target torque Te* of the engine 22 and torque commands Tm1* and Tm2* of the motors MG1 and MG2, such that the required power Pe* is output from the engine 22 and that the required torque Td* is output to the driveshaft 36. The HVECU 70 subsequently sets a target voltage VH* of the high voltage-side power lines 54a (capacitor 57), based on the torque commands Tm1* and Tm2* and the rotation speeds Nm1 and Nm2 of the respective motors MG1 and MG2. The HVECU 70 then sends the target rotation speed Ne* and the target torque Te* of the engine 22 to the engine ECU 24, while sending the torque commands Tm1* and Tm2* of the motors MG1 and MG2 and the target voltage VH* of the high voltage-side power lines 54a to the motor ECU 40. The engine ECU 24 performs, for example, intake air flow control, fuel injection control and ignition control of the engine 22 such as to operate the engine 22 with the target rotation speed Ne* and the target torque Te*. The motor ECU 40 performs switching control of the transistors T11 to T16 of the inverter 41 and the transistors T21 to T26 of the inverter 42 such as to drive the motors MG1 and MG2 with the torque commands Tm1* and Tm2*, while performing switching control of the transistors T31 and T32 of the boost converter 55 such as to make the voltage VH of the high voltage-side power lines 54a (high voltage-side voltage) equal to the target voltage VH+

In the EV drive mode, the HVECU 70 sets the required torque Td*, based on the accelerator position Acc and the vehicle speed V, and sets a value "0" to the torque command Tm1* of the motor MG1. The HVECU 70 also sets the torque command Tm2* of the motor MG2 such that the required torque Td* is output to the driveshaft 36, and sets the target voltage VH* of the high voltage-side power lines 54a, based on the torque commands Tm1* and Tm2* and the rotation speeds Nm1 and Nm2 of the respective motors MG1 and MG2. The HVECU 70 then sends the torque commands Tm1* and Tm2* of the motors MG1 and MG2 and the target voltage VH* of the high voltage-side power lines 54a to the motor ECU 40. The motor ECU 40 controls the inverters 41 and 42 and the boost converter 55 as described above.

Figure 3:
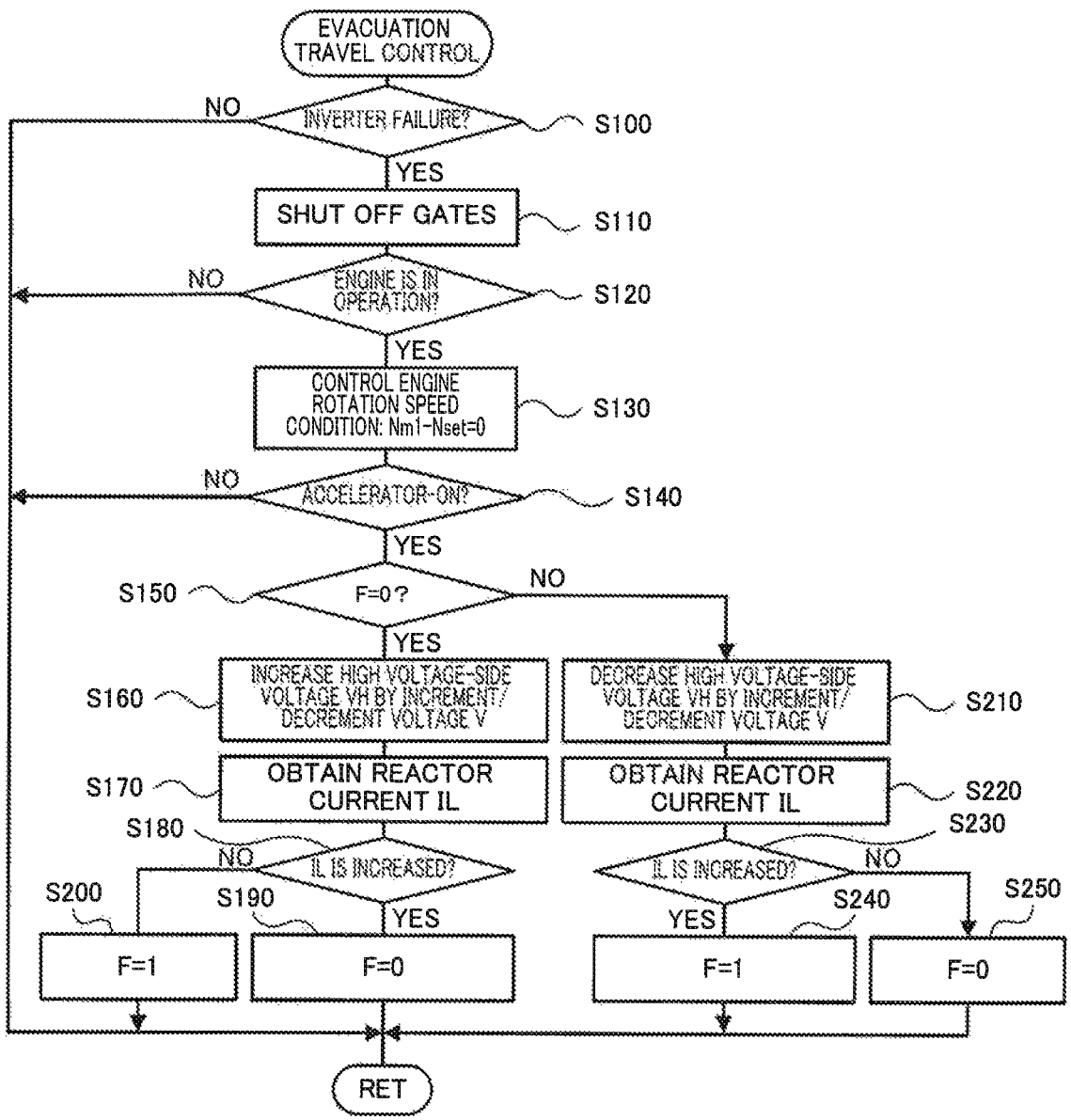
FIG. 3 is a flowchart showing one example of evacuation travel control performed by a motor ECU.

The following describes operations of the hybrid vehicle 20 of the embodiment having the above configuration and more specifically series of operations in evacuation travel in the event of a failure (inverter failure) where the inverters 41 and 42 malfunction. FIG. 3 is a flowchart showing one example of evacuation travel control performed by the motor ECU 40 in the event of an inverter failure. This process is repeatedly performed at predetermined time intervals (for example, at every several msec).

When the evacuation travel control is triggered, the motor ECU 40 first determines whether there is an inverter failure (step S100). When it is determined that there is no inverter failure, the motor ECU 40 determines that this process is not required and immediately terminates this process. When it is determined that there is an inverter failure, on the other hand, the motor ECU 40 shuts off the gates of the inverters 41 and 42 (step S110) and subsequently determines whether the engine 22 is in operation (step S120). When it is determined that the engine 22 is at stop, the motor ECU 40 determines that this process is not required and terminates this process. When it is determined that the engine 22 is in operation, on the other hand, the motor ECU 40 sends a control signal for controlling the rotation speed Ne of the engine 22 to make the rotation speed Nm1 of the motor MG1 equal to a predetermined rotation speed Nset to the HVECU 70 (step S130). The predetermined rotation speed Nset herein denotes a rotation speed (for example, 6500 rpm) of the motor MG1 to maximize a full-wave rectifying torque (regenerative torque) of the motor MG1 at a predetermined voltage V1 (for example, 350 V) as the high voltage-side voltage VH. When the control signal for controlling the rotation speed Ne of the engine 22 to make the rotation speed Nm1 of the motor MG1 equal to the predetermined rotation speed Nset is sent to the HVECU 70, this control signal is further sent from the HVECU 70 to the engine ECU 24. When receiving this control signal, the engine ECU 24 performs intake air flow control, fuel injection control and ignition control of the engine 22, such as to make the rotation speed Nm1 of the motor MG1 equal to the predetermined rotation speed Nset.

The motor ECU 40 subsequently determines whether it is in an accelerator-on state by depression of the accelerator pedal 83 (step S140). When it is determined that it is not in the accelerator-on state, the motor ECU 40 determines that a drive torque is not required and terminates this process.

When it is determined that it is in the accelerator-on state, on the other hand, the motor ECU 40 subsequently determines whether a process determination flag F is equal to value 0 (step S150). This process determination flag F is set in this control and is set to value 0 as an initial value. When it is determined that the process determination flag F is equal to the value 0, the motor ECU 40 increases the high voltage-side voltage VH by an increment/decrement voltage ΔV (step S160), obtains an input of the reactor current IL from the current sensor 55a (step S170) and determines whether the reactor current IL is increased (step S180). When it is determined that the reactor current IL is increased, the motor ECU 40 sets the process determination flag F to the value 0 (step S190) and terminates this process. When it is determined that the reactor current IL is not increased but is decreased, on the other hand, the motor ECU 40 sets the process determination flag F to value 1 (step S200) and terminates this process. While the accelerator-on state continues and it is determined that the reactor current IL is increased, the processing of steps S100 to S190 is repeatedly performed to increase the high voltage-side voltage VH by the increment/decrement voltage ΔV. The high voltage-side voltage VH may be controlled by the boost converter 55.

When it is determined at step S150 that the process determination flag F is not equal to the value 0 but is equal to the value 1, on the other hand, the motor ECU 40 decreases the high voltage-side voltage VH by the increment/decrement voltage ΔV (step S210), obtains an input of the reactor current IL from the current sensor 55a (step S220) and determines whether the reactor current IL is increased (step S230). When it is determined that the reactor current IL is increased, the motor ECU 40 sets the process determination flag F to the value 1 (step S240) and terminates this process. When it is determined that the reactor current IL is not increased but is decreased, on the other hand, the motor ECU 40 sets the process determination flag F to the value 0 (step S250) and terminates this process. While the accelerator-on state continues and it is determined that the reactor current IL is increased, the processing of steps S100 to S150 and S210 to S240 is repeatedly performed to decrease the high voltage-side voltage VH by the increment/decrement voltage ΔV.

Figure 4:
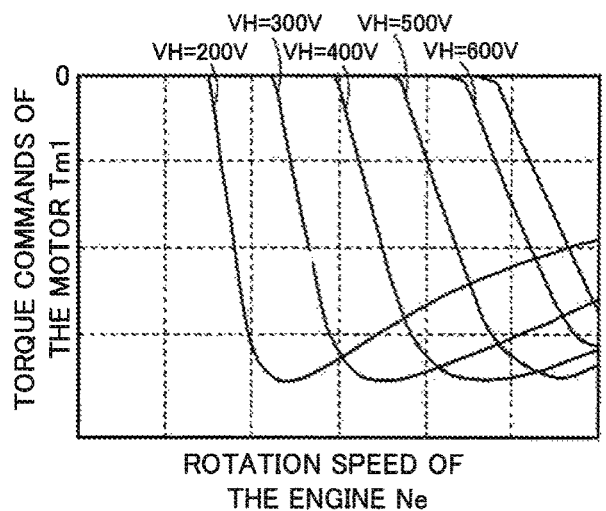
FIG. 4 is a diagram illustrating one example of relationship between a full-wave rectifying torque of the motor MG1 and a rotation speed of the motor MG1 with regard to various values of a high voltage-side voltage VH.

Such control converges the high voltage-side voltage VH to a voltage that maximizes the reactor current IL. The reactor current IL denotes an electric current flowing from the high voltage-side power lines 54a to the low voltage-side power lines 54b via the boost converter 55 by a reverse voltage of the motor MG1. The larger reactor current IL accordingly gives the larger full-wave rectifying torque (regenerative torque) of the motor MG1. This control makes the rotation speed Nm1 of the motor MG1 equal to the predetermined rotation speed Nset and then controls the high voltage-side voltage VH such as to maximize the reactor current IL. In other words, this control serves to control the high voltage-side voltage VH such as to maximize the full-wave rectifying torque (regenerative torque) of the motor MG1. The full-wave rectifying torque (regenerative torque) of the motor MG1 is determined by a potential difference between the reverse voltage of the motor MG1 and the high voltage-side voltage VH. As shown in FIG. 4, different values of the high voltage-side voltage VH give different rotation speeds of the motor MG1 that maximize the full-wave rectifying torque (regenerative torque) of the motor MG1. Even at an identical high voltage-side voltage VH, however, the rotation speed of the motor MG1 that maximizes the full-wave rectifying torque (regenerative torque) of the motor MG1 differs, depending on the production tolerance of the motor MG1, the temperature of the motor MG1 and the sensing error of the voltage sensor. The configuration of this embodiment takes into account such circumstances and performs the above control to maximize the full-wave rectifying torque (regenerative torque) of the motor MG1. Maximizing the full-wave rectifying torque (regenerative torque) of the motor MG1 in the accelerator-on state is attributed to such a reason that the motor MG1 is not able to output a significantly large regenerative torque, compared with that in the state of normal operation of the inverter 41.

Figure 5:
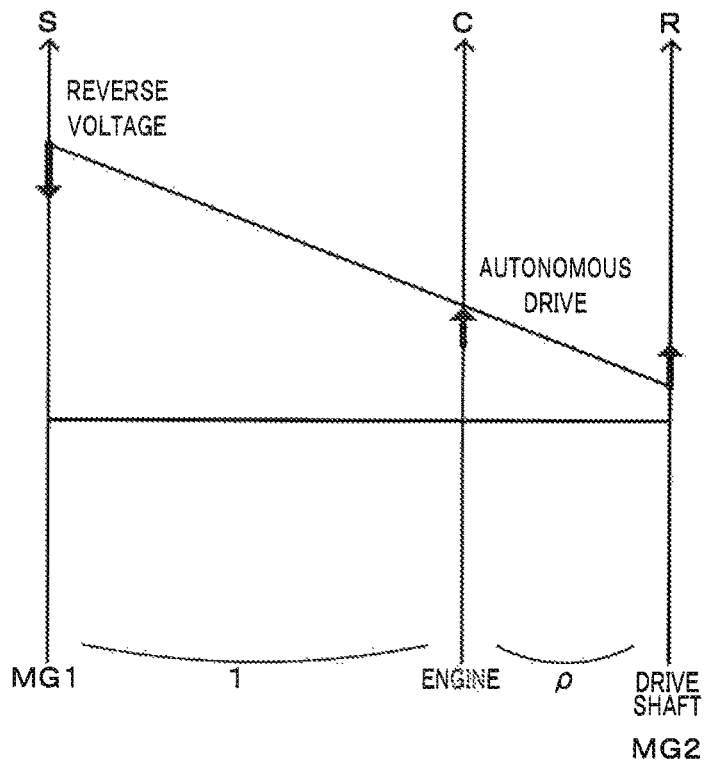
FIG. 5 is an alignment chart showing a dynamic relationship between rotation speed and torque with regard to rotational elements of a planetary gear.

FIG. 5 is an alignment chart showing a dynamic relationship between rotation speed and torque with regard to the rotational elements of the planetary gear 30 during a drive of the hybrid vehicle 20 with the full-wave rectifying torque (regenerative torque) generated by generation of a reverse voltage of the motor MG1. In FIG. 5, an S axis on the left side shows the rotation speed of the sun gear that is equal to the rotation speed Nm1 of the motor MG1. A C axis shows the rotation speed of the carrier that is equal to the rotation speed Ne of the engine 22. An R axis shows the rotation speed Nr of the ring gear that is equal to the rotation speed Nm2 of the motor MG2. A thick arrow on the R axis indicates a torque that is output from the motor MG1 and is applied to the driveshaft 36 via the planetary gear 30. As illustrated, the full-wave rectifying torque generated by generation of the reverse voltage of the motor MG1 is applied to the driveshaft 36 via the planetary gear 30, and the hybrid vehicle 20 is driven with this applied torque as the drive torque.

In the event of an inverter failure, the hybrid vehicle 20 of the embodiment described above shuts off the gates of the inverters 41 and 42, makes the rotation speed Nm1 of the motor MG1 equal to the predetermined rotation speed Nset and then controls the high voltage-side voltage VH to maximize the reactor current IL. This maximizes the full-wave rectifying torque (regenerative torque) of the motor MG1. As a result, a larger torque can be output from the motor MG1 during the evacuation travel.

In the hybrid vehicle of the above aspect, the control device may control the high voltage-side voltage such as to maximize the inter-line current, based on an increase or decrease in the inter-line current with an increase or decrease of the high voltage-side voltage in the evacuation travel. For example, the hybrid vehicle of this aspect may perform controls (1) to (4) described below. This maximizes the torque of the first motor, irrespective of, for example, the production tolerance of the motor, the temperature change of the motor and the sensing error of the voltage sensor or the like:

(1) further increasing the high voltage-side voltage when the inter-line voltage is increased with an increase in the high voltage-side voltage;

(2) decreasing the high voltage-side voltage when the inter-line voltage is decreased with an increase in the high voltage-side voltage;

(3) further decreasing the high voltage-side voltage when the inter-line voltage is increased with a decrease in the high voltage-side voltage; and (4) increasing the high voltage-side voltage when the inter-line voltage is decreased with a decrease in the high voltage-side voltage.

In the hybrid vehicle of the present disclosure, the predetermined rotation speed may be a rotation speed of the first motor that maximizes a full-wave rectifying torque of the first motor at a predetermined voltage as the high voltage-side voltage.

The following describes the correspondence relationship between the primary elements of the above embodiment and the primary elements of the disclosure described in Summary. The engine 22 of the embodiment corresponds to the "engine", the motor MG1 corresponds to the "first motor", and the planetary gear 30 corresponds to the "planetary gear mechanism". The motor MG2 corresponds to the "second motor", the inverter 41 corresponds to the "first inverter", the inverter 42 corresponds to the "second inverter", and the battery 50 corresponds to the "power storage device". The low voltage-side power lines 54b correspond to the "first power line", the high voltage-side power lines 54a correspond to the "second power line", and the boost converter 55 corresponds to the "converter". The HVECU 70, the engine ECU 24, the motor ECU 40, and the battery ECU 52 correspond to the "control device" The reactor current IL corresponds to the "inter-line current".

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present disclosure, regarding which the problem is described in Summary, should be interpreted on the basis of the description in Summary, and the embodiment is only a specific example of the present disclosure, regarding which the problem is described in Summary.

The aspect of the present disclosure is described above with reference to the embodiment. The present disclosure is, however, not limited to the above embodiment but various modifications and variations may be made to the embodiment without departing from the scope of the present disclosure.

INDUSTRIAL APPLICABILITY

The disclosure is applicable to, for example, the manufacturing industries of hybrid vehicles.

The invention claimed is:

1. A hybrid vehicle, comprising:
an engine;
a first motor configured to generate a reverse voltage by rotation;
a planetary gear mechanism configured such that three rotational elements are respectively connected with a driveshaft coupled with an axle, with the engine, and with the first motor;
a second motor configured to input and output power from and to the driveshaft;
a first inverter configured to drive the first motor;
a second inverter configured to drive the second motor;
a power storage device;
a converter connected with a first power line that is connected with the power storage device, and with a second power line that is connected with the first inverter and the second inverter, and configured to transmit electric power between the first power line and the second power line by regulating a high voltage-side voltage of the second power line; and
a control device configured to control the engine, the converter, the first inverter and the second inverter, wherein
in an evacuation travel with an accelerator-on operation during an inverter failure where the first inverter and the second inverter malfunction, the control device shuts off gates of the first inverter and the second inverter, controls a rotation speed of the engine such as to rotate the first motor at a predetermined rotation speed, and controls the high voltage-side voltage such as to maximize an inter-line current that flows from the second power line to the first power line via the converter, and
the control device controls the high voltage-side voltage such as to maximize the inter-line current by:
determining whether or not the inter-line current is increased; and
increasing or decreasing the high voltage-side voltage based on whether or not the inter-line current is determined to be increased.

2. The hybrid vehicle according to claim 1,
wherein the control device controls the high voltage-side voltage such as to maximize the inter-line current by setting a flag based on an increase or decrease in the inter-line current, and increasing or decreasing the high voltage-side voltage in the evacuation travel based on the flag.

3. The hybrid vehicle according to claim 2,
wherein the control device controls the high voltage-side voltage such as to maximize the inter-line current by:
further increasing the high voltage-side voltage when the inter-line voltage is increased with an increase in the high voltage-side voltage;
decreasing the high voltage-side voltage when the inter-line voltage is decreased with an increase in the high voltage-side voltage;
further decreasing the high voltage-side voltage when the inter-line voltage is increased with a decrease in the high voltage-side voltage; and
increasing the high voltage-side voltage when the inter-line voltage is decreased with a decrease in the high voltage-side voltage.

4. The hybrid vehicle according to claim 1,
wherein the predetermined rotation speed is a rotation speed of the first motor that maximizes a full-wave rectifying torque of the first motor at a predetermined voltage as the high voltage-side voltage.

5. The hybrid vehicle according to claim 1,
wherein the hybrid vehicle is configured such that when the reverse voltage becomes higher than a DC-side voltage of the first inverter and the second inverter, a torque is output from the first motor, and the inter-line current flows from the second power line to the first power line.

6. The hybrid vehicle according to claim 5,
wherein the hybrid vehicle is configured such that the torque output from the first motor is output via the planetary gear mechanism to the driveshaft as a drive torque and is used as torque for driving the vehicle.

7. The hybrid vehicle according to claim 1, further comprising:
a current sensor configured to sense the inter-line current.

* * * * *